(12) United States Patent
Burns et al.

(10) Patent No.: US 11,960,657 B2
(45) Date of Patent: Apr. 16, 2024

(54) TARGETED DROP OF A COMPUTER-GENERATED OBJECT

(71) Applicant: Apple Inc., Cupertino, CA (US)

(72) Inventors: Aaron M. Burns, Sunnyvale, CA (US); Adam G. Poulos, Saratoga, CA (US); Arun Rakesh Yoganandan, San Francisco, CA (US); Benjamin Hylak, San Francisco, CA (US); Benjamin R. Blachnitzky, San Francisco, CA (US); Jordan A. Cazamias, San Francisco, CA (US); Nicolai Georg, San Francisco, CA (US)

( * ) Notice: Subject to any disclaimer, the term of this patent is extended or adjusted under 35 U.S.C. 154(b) by 0 days.

(21) Appl. No.: 18/124,120

(22) Filed: Mar. 21, 2023

(65) Prior Publication Data
US 2023/0297172 A1    Sep. 21, 2023

Related U.S. Application Data

(63) Continuation of application No. PCT/US2021/050309, filed on Sep. 14, 2021.
(Continued)

(51) Int. Cl.
*G06F 3/0346*    (2013.01)
*G06F 3/01*    (2006.01)
(Continued)

(52) U.S. Cl.
CPC .............. *G06F 3/017* (2013.01); *G06F 3/014* (2013.01); *G06F 3/0346* (2013.01); *G06F 3/038* (2013.01);
(Continued)

(58) Field of Classification Search
CPC ........ G06F 3/017; G06F 3/014; G06F 3/0346; G06F 3/038; G06F 3/0486; G06F 2203/0331; G06T 7/20; G06T 2207/30196
See application file for complete search history.

(56) References Cited

U.S. PATENT DOCUMENTS

| 2014/0071069 A1 | 3/2014 | Anderson et al. |
| 2019/0362557 A1 | 11/2019 | Lacey et al. |

(Continued)

FOREIGN PATENT DOCUMENTS

| WO | 2019213111 A1 | 11/2019 |
| WO | 2019229698 A1 | 12/2019 |
| WO | 2020159302 A1 | 8/2020 |

OTHER PUBLICATIONS

PCT International Search Report and Written Opinion dated Jan. 4, 2022, International Application No. PCT/US2021/050309, pp. 1-13.

*Primary Examiner* — Robert J Michaud
(74) *Attorney, Agent, or Firm* — Fernando & Partners, LLP

(57) ABSTRACT

A method includes, while displaying a computer-generated object at a first position within a environment, obtaining extremity tracking data from an extremity tracker. The first position is outside of a drop region that is viewable using the display. The method includes moving the computer-generated object from the first position to a second position within the environment based on the extremity tracking data. The method includes, in response to determining that the second position satisfies a proximity threshold with respect to the drop region, detecting an input that is associated with a spatial region of the environment. The method includes moving the computer-generated object from the second position to a third position that is within the drop region, (Continued)

based on determining that the spatial region satisfies a focus criterion associated with the drop region.

22 Claims, 16 Drawing Sheets

Related U.S. Application Data

(60) Provisional application No. 63/082,190, filed on Sep. 23, 2020.

(51) Int. Cl.
*G06F 3/038* (2013.01)
*G06F 3/0486* (2013.01)
*G06T 7/20* (2017.01)

(52) U.S. Cl.
CPC .............. *G06F 3/0486* (2013.01); *G06T 7/20* (2013.01); *G06F 2203/0331* (2013.01); *G06T 2207/30196* (2013.01)

(56) References Cited

U.S. PATENT DOCUMENTS

| | | | |
|---|---|---|---|
| 2020/0026352 A1* | 1/2020 | Wang | G06F 3/044 |
| 2020/0159361 A1 | 5/2020 | Rosenberg et al. | |
| 2021/0225084 A1* | 7/2021 | O'Connell | G06F 3/017 |

* cited by examiner

TARGETED DROP OF A COMPUTER-GENERATED OBJECT

CROSS-REFERENCE TO RELATED APPLICATIONS

This application is a continuation of Intl. Patent App. No. PCT/US2021/050309, filed on Sep. 14, 2021, which claims priority to U.S. Provisional Patent App. No. 63/082,190, filed on Sep. 23, 2020, which are both hereby incorporated by reference in their entirety.

TECHNICAL FIELD

The present disclosure relates to displaying a computer-generated object, and in particular manipulating the computer-generated object.

BACKGROUND

In general, utilizing a current input modality in order to manipulate a computer-generated object produces various inaccuracies associated with the manipulation. For example, a physical object may obscure a portion of a computer-generated object, thereby reducing a tracking accuracy associated with a particular input modality. As another example, a computer-generated object that has a greater depth with respect to the display, such as a background computer-generated object, may be difficult for a user to manipulate, thereby introducing further tracking inaccuracies.

SUMMARY

In accordance with some implementations, a method is performed at an electronic device with one or more processors, a non-transitory memory, a display, and a communication interface provided to communicate with a finger-wearable device. The method includes, while displaying a computer-generated object at a first position within an environment, obtaining finger manipulation data from the finger-wearable device via the communication interface. The first position is outside of a drop region that is viewable using the display. The method includes moving the computer-generated object from the first position to a second position within the environment based on the finger manipulation data. The method includes, in response to determining that the second position satisfies a proximity threshold with respect to the drop region, in accordance with detecting satisfaction of one or more drop criteria, moving the computer-generated object from the second position to a third position that is within the drop region.

In accordance with some implementations, an electronic device includes one or more processors, a non-transitory memory, a display, and a communication interface provided to communicate with a finger-wearable device. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
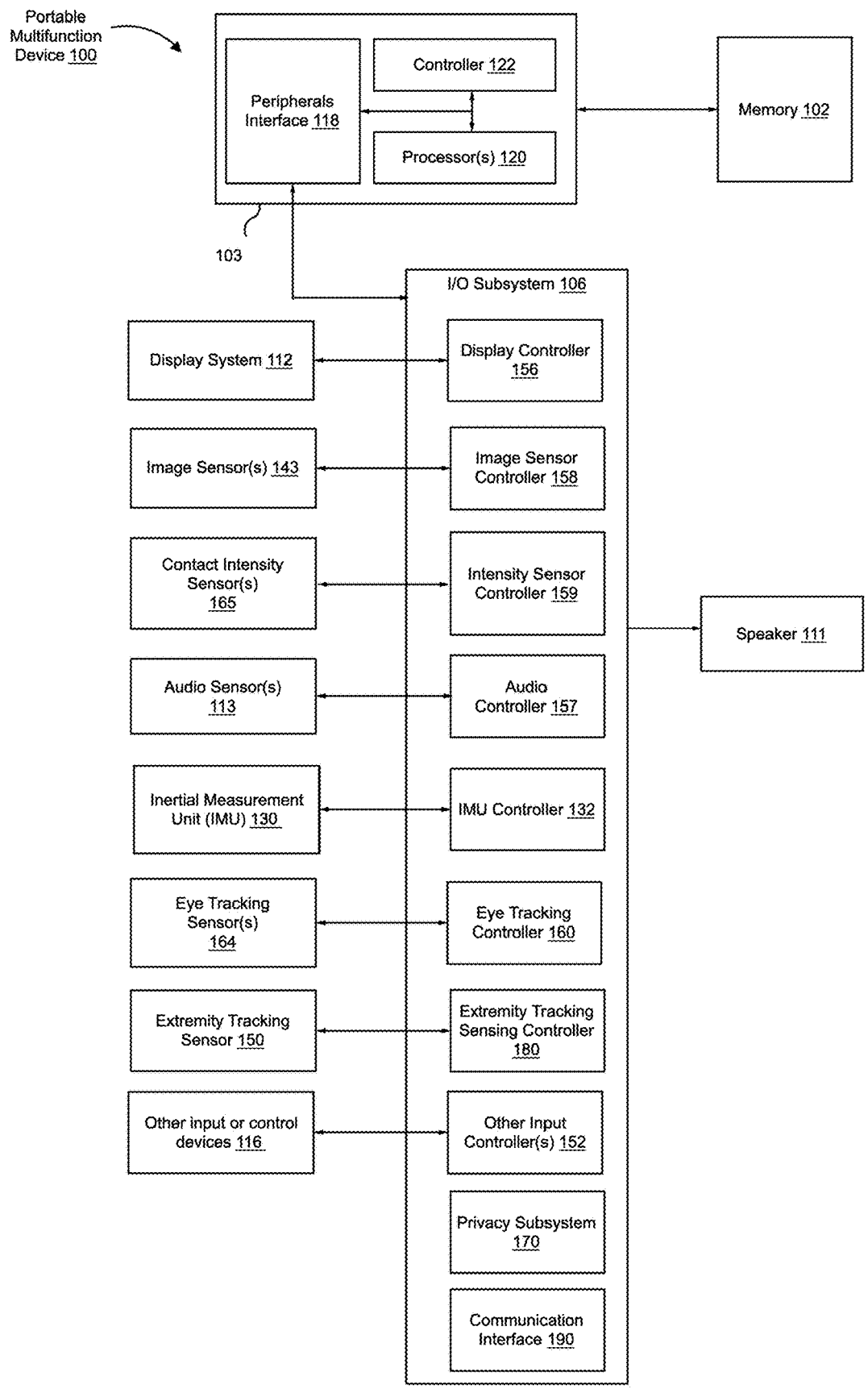
FIG. 1 is a block diagram of an example of a portable multifunction device in accordance with some implementations.

An electronic device, including an integrated input system, may manipulate the display of a computer-generated object based on an input from the integrated input system. For example, the integrated input system includes an extremity tracking input system and/or an eye tracking input system. As one example, based on an extremity tracking input from the extremity tracking input system, the electronic device determines a corresponding extremity of a user satisfies a proximity threshold with respect to a particular computer-generated object. Accordingly, the electronic device manipulates the particular computer-generated object based on the extremity tracking input. However, utilizing an input from an integrated input system in order to manipulate a computer-generated object introduces a number of issues. For example, when a physical object occludes (e.g., blocks) a portion of a user's extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to manipulate, thereby introducing extremity tracking and eye tracking inaccuracies.

By contrast, various implementations disclosed herein include methods, electronic devices, and systems for moving a computer-generated object to within a drop region, based on finger manipulation data from a finger-wearable device. To that end, an electronic device moves the computer-generated object from a first position to a second position based on the finger manipulation data, and determines whether the second position satisfies a proximity threshold with respect to the drop region. The first position is outside of the drop region, which is viewable using the display. The drop region may be a physical (e.g., real-world) drop region or a computer-generated drop region. For example, in some implementations, the electronic device performs a computer-vision technique with respect to image data (e.g., output by an integrated camera) in order to identify a physical drop region represented by the image data, such as a physical bucket or a physical basket.

In response to determining that the second position satisfies the proximity threshold, the electronic device determines whether one or more drop criteria are satisfied. For example, the one or more drop criteria include a disengagement criterion, which may be satisfied when the finger manipulation data is indicative of a disengagement gesture (e.g., a de-pinch gesture, sometimes referred to as a pinch and release gesture). As another example, the one or more drop criteria include a focus criterion. The focus criterion may be satisfied when tracking data indicates an adequate amount of focus associated with the drop region. For example, eye gaze data indicating that eye gaze of a user is directed to the drop region for a threshold amount of time. In response to detecting satisfaction of the one or more drop criteria, the electronic device moves (e.g., automatically, without user intervention) the computer-generated object from the second position to a third position that is within the drop region.

The finger-wearable device can be worn by a finger of a user. In some implementations, the electronic device tracks the finger with six degrees of freedom (6DOF) based on the finger manipulation data. Accordingly, even when a physical object occludes a portion of the finger-wearable device, the electronic device continues to receive finger manipulation data from the finger-wearable device. On the other hand, other devices that utilize extremity tracking cannot track an extremity of a user when a physical object occludes the extremity. Additionally, the electronic device enables object engagement (e.g., disambiguation, manipulation, etc.) based on the finger manipulation data, independent of an apparent distance between the finger-wearable device and the content manipulation region, resulting in greater control and accuracy.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

In some implementations, the display system 112 corresponds to a touch-sensitive display. For example, the display system 112 has a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

In some implementations, the user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
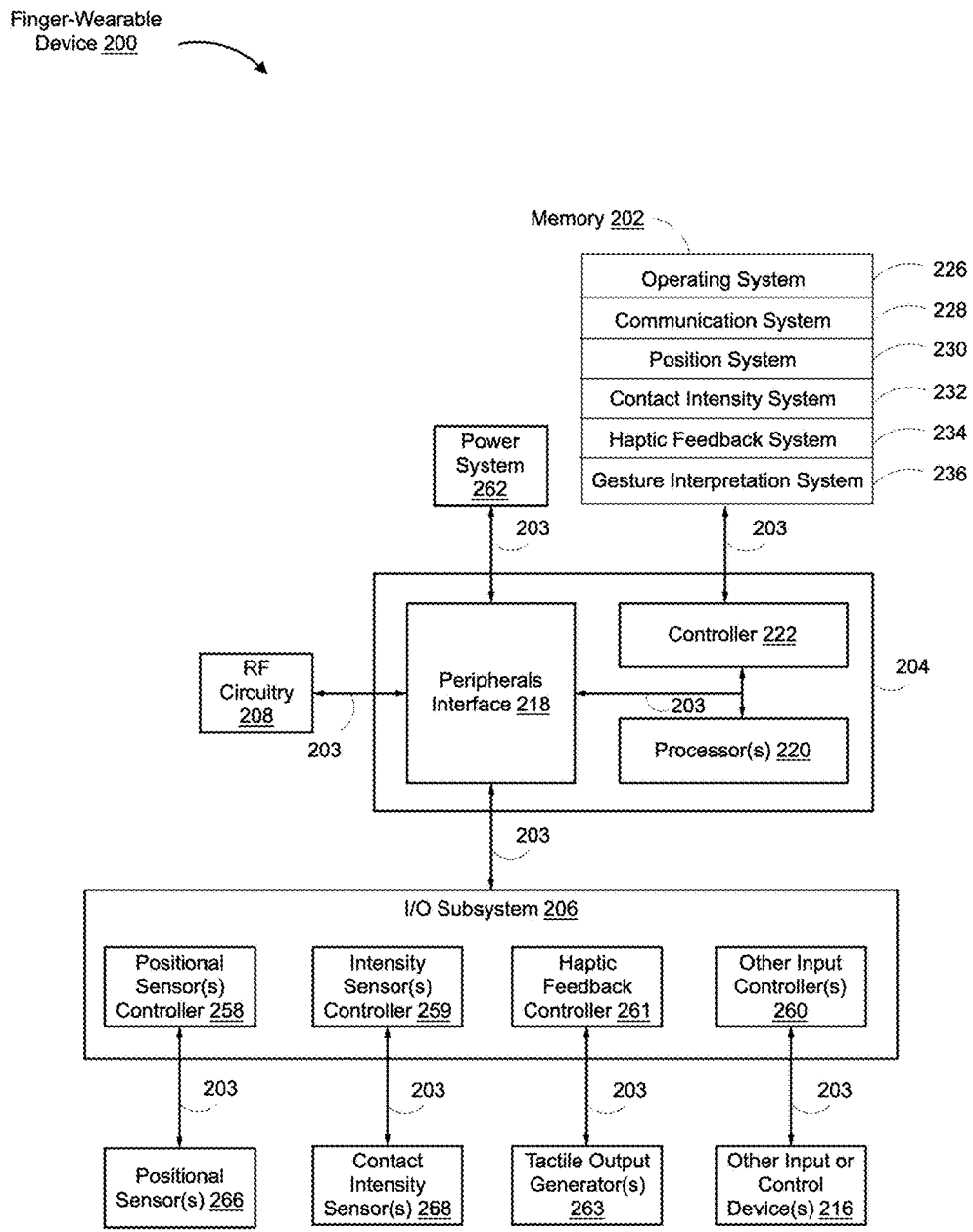
FIG. 2 is a block diagram of an example of a finger-wearable device in accordance with some implementations.

The electronic device 100 includes a communication interface 190 that is provided to communicate with a finger-wearable device, such as the finger-wearable device 200 illustrated in FIG. 2 or the finger-wearable device 320 in FIGS. 3A-3M. For example, the communication interface 190 corresponds to one of a BLUETOOTH interface, IEEE 802.11x interface, near field communication (NFC) interface, and/or the like. According to various implementations, the electronic device 100 obtains finger manipulation data from the finger-wearable device via the communication interface 190, as will be further described below.

FIG. 2 is a block diagram of an example of a finger-wearable device 200. The finger-wearable device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the finger-wearable device 200 illustrated in FIG. 2 is one example of a finger-wearable device, and that the finger-wearable device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The finger-wearable device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the finger-wearable device 200, such as CPU(s) 220 and the peripherals interface 218, is, optionally, controlled by memory controller 222.

The peripherals interface 218 can be used to couple input and output peripherals of the finger-wearable device 200 to the CPU(s) 220 and the memory 202. The one or more processors 220 run or execute various software programs and/or sets of instructions stored in memory 202 to perform various functions for the finger-wearable device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the finger-wearable device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the finger-wearable device 200 includes one or more positional sensors 266 that output positional data associated with the finger-wearable device 200. The positional data is indicative of a position, orientation, or movement of the finger-wearable device 200, such as a rotational movement or translational movement of the finger-wearable device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data and/or 3D orientation data, such as the position of the finger-wearable device 200. For example, the magnetic sensor measures weak magnetic fields in order to determine a position of the finger-wearable device 200.

In some implementations, the finger-wearable device 200 includes one or more contact intensity sensors 268 for detecting intensity (e.g., force or pressure) of a contact of a finger, wearing the finger-wearable device 200, on a physical object. The one or more contact intensity sensors 268 output contact intensity data associated with the finger-wearable device 200. As one example, the contact intensity data is indicative of the force or pressure of a tap gesture associated with a finger, which is wearing the finger-wearable device 200, tapping on a surface of a physical table. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors.

The finger-wearable device 200 optionally includes one or more tactile output generators 263 for generating tactile outputs on the finger-wearable device 200. In some implementations, the term "tactile output" refers to physical displacement of an accessory (e.g., the finger-wearable device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 200) is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the finger-wearable device 200 that are capable of being sensed by a user of the finger-wearable device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores device/global internal state associated with the finger-wearable device. The device/global internal state includes one or more of: sensor state, including information obtained from the finger wearable device's various sensors and other input or control devices 216; positional state, including information regarding the finger-wearable device's position (e.g., position, orientation, tilt, roll and/or distance) relative to an electronic device (e.g., the electronic device 100); and location information concerning the finger-wearable device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the finger-wearable device 200. The position system 230 optionally includes software components for performing various operations related to detecting the position of the finger-wearable device 200 and detecting changes to the position of the finger-wearable device 200 in a particular frame of reference. In some implementations, the position system 230 detects the positional state of the finger-wearable device 200 relative to the electronic device and detects changes to the positional state of the finger-wearable device 200 relative to the electronic device. As noted above, in some implementations, the electronic device 100 or 310 determines the positional state of the finger-wearable device 200 relative to the electronic device and changes to the positional state of the finger-wearable device 200 using information from the position system 230.

The contact intensity system 232, in conjunction with contact intensity data from the one or more contact intensity sensor(s) 268, optionally detects contact intensity information associated with the finger-wearable device 200. The contact intensity system 232 includes software components for performing various operations related to detection of contact, such as detecting the intensity and/or duration of a contact between the finger-wearable device 200 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on finger-wearable device 200 in response to user interactions with the finger-wearable device 200.

The finger-wearable device 200 optionally includes a gesture interpretation system 236. The gesture interpretation system 236 coordinates with the position system 230 and/or the contact intensity system 232 in order to determine a gesture performed by the finger-wearable device. For example, the gesture includes one or more of: a pinch gesture, a pull gesture, a pinch and pull gesture, a rotational gesture, a tap gesture, and/or the like. In some implementations, the finger-wearable device 200 does not include a gesture interpretation system, and an electronic device or a system determines a gesture performed by the finger-wearable device 200 based on finger manipulation data from the finger-wearable device 200. In some implementations, a portion of the gesture determination is performed at the finger-wearable device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture, such as an amount of pressure associated with a finger (wearing the finger-wearable device 200) tapping on a physical surface.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3M are examples of an electronic device 310 moving computer-generated objects to within a drop region based on finger manipulation data in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 3A:
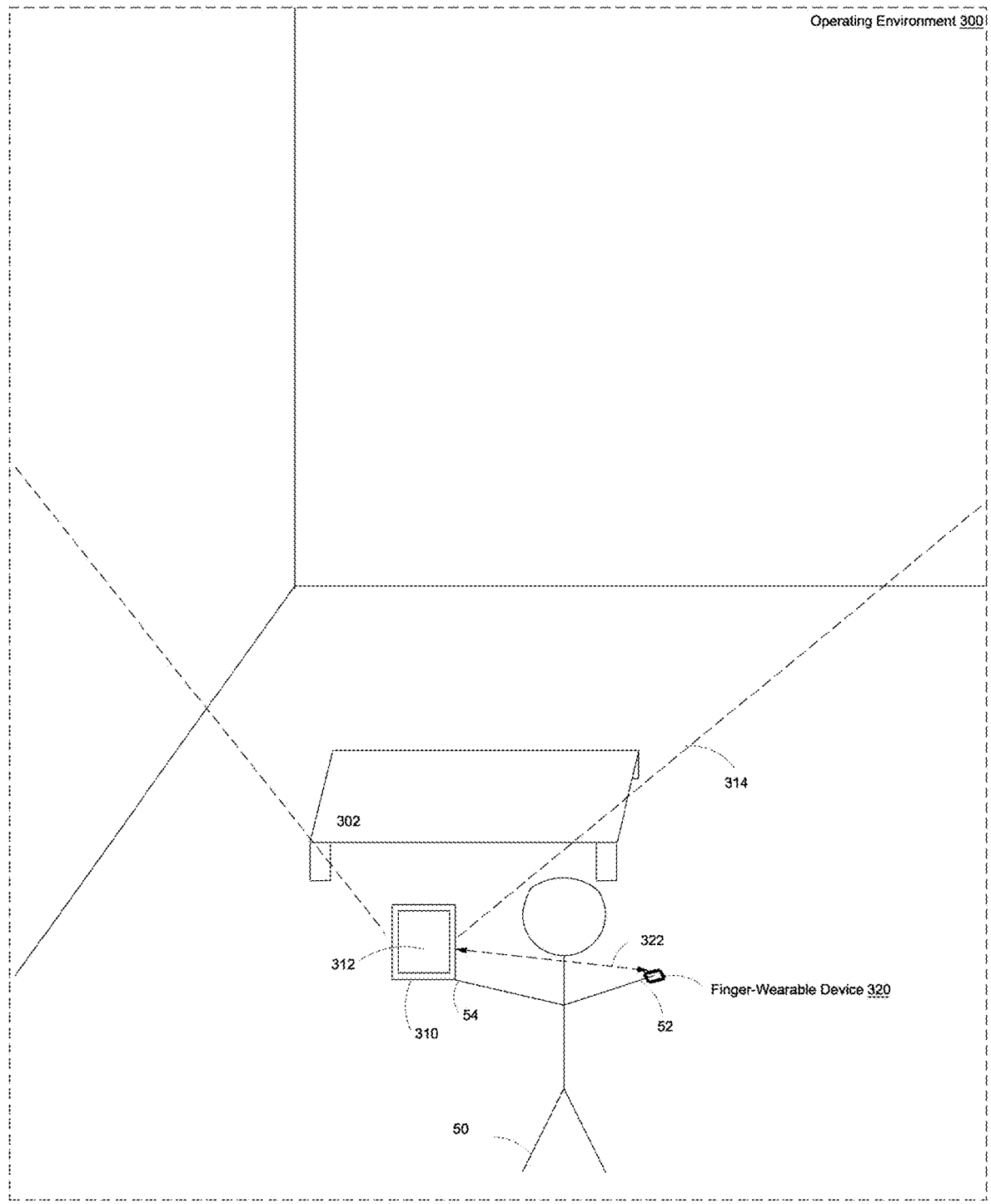
FIGS. 3A-3M are examples of an electronic device moving computer-generated objects to within a drop region based on finger manipulation data in accordance with some implementations.

As illustrated in FIG. 3A, an electronic device 310 is associated with (e.g., operates according to) an operating environment 300. In some implementations, the electronic device 310 is similar to and adapted from the electronic device 100 in FIG. 1. In some implementations, the electronic device 310 generates one of the XR settings described above.

The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass through image data from the image sensor with computer-generated content. As another example, in some implementations, the electronic device 310 includes a see-through display 312 that enables ambient light to enter from a portion of a physical environment that is associated with the viewable region 314. The operating environment 300 includes a physical table 302, and the viewable region 314 includes a portion of the physical table 302.

A finger-wearable device 320 can be worn on a finger of a first hand 52 of a user 50. In some implementations, the finger-wearable device 320 is similar to and adapted from the finger-wearable device 200 illustrated in FIG. 2.

In some implementations, the electronic device 310 includes a communication interface (e.g., the communication interface 190 in FIG. 1) that is provided to communicate with the finger-wearable device 320. The electronic device 310 establishes a communication link with the finger-wearable device 320, as is indicated by a communication link line 322. Establishing the link between the electronic device 310 and the finger-wearable device 320 is sometimes referred to as pairing or tethering. One of ordinary skill in the art will appreciate that the electronic device 310 may communicate with the finger-wearable device 320 according to a variety of communication protocols, such as BLUETOOTH, IEEE 802.11x, NFC, etc. The electronic device 310 obtains finger manipulation data from the finger-wearable device 320 via the communication interface. For example, the electronic device 310 obtains a combination of positional data (e.g., output by an IMU sensor and/or a magnetic sensor of the finger-wearable device 320) and contact intensity data (e.g., output by contact intensity sensor(s) of the finger-wearable device 320).

In some implementations, as illustrated in FIG. 3A, a second hand 54 of the user 50 is holding the electronic device 310. For example, in some implementations, the electronic device 310 corresponds to one of a smartphone, laptop, tablet, etc.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be characterized by an XR environment. For example, the image sensor obtains image data that represents the portion of the physical table 302, and the generated display data, displayed on the display 312, includes a representation of the portion of the physical table 302 (See FIG. 3B).

In some implementations, the display 312 corresponds to a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 300. For example, a see-through display permits ambient light from the operating environment 300 that includes the portion of the physical table 302, and thus the see-through display displays a representation of the portion of the physical table 302 (See FIG. 3B).

Figure 3B:
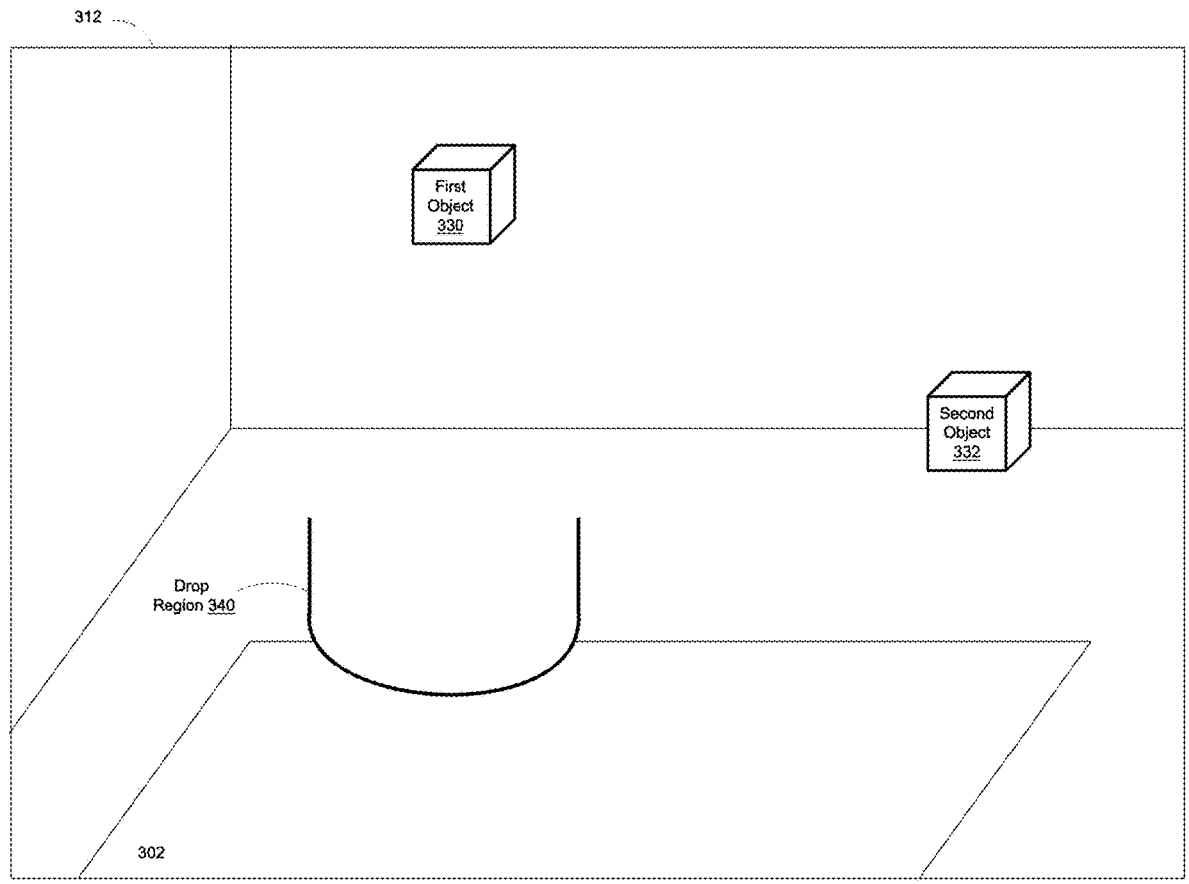

As illustrated in FIG. 3B, the electronic device 310 displays, on the display 312, a representation of the portion of the physical table 302 (hereinafter sometimes "the portion of the physical table 302" or the "physical table 302" for the sake of brevity). Moreover, the electronic device 310 displays, on the display 312, a first computer-generated object 330, a second computer-generated object 332, and a drop region 340. The first computer-generated object 330 and the second computer-generated object 332 may be associated with (e.g., representative of) a variety of content types, such as audio content, video content, image content, file content, textual content, metadata content, database content, and/or the like. Although the drop region 340 resembles an elongated u-shape, one of ordinary skill in the art will appreciate that the drop region 340 may correspond to any type of appearance suitable for receiving or holding a computer-generated object, such as having a different shape, different dimensions, etc. For example, the drop region 340 may correspond to a three-dimensional (3D) object, such as a computer-generated receptacle (e.g., a computer-generated basket). In some implementations, the electronic device 310 displays the drop region 340 overlaid on a physical object, such as on the physical table 302 in FIG. 3B. To that end, in some implementations, the electronic device 310 performs a computer-vision technique with respect to image data (e.g., pass-through image data or camera data) in order to identify a suitable physical surface. Moreover, although the drop region 340 illustrated in FIG. 3B corresponds to a computer-generated drop region, in some implementations, the drop region 340 corresponds to a physical drop region. For example, in some implementations, the electronic device 310 performs a computer-vision technique (e.g., semantic segmentation) with respect to image data in order to identify a physical object that is suitable to select as the drop region, such as a physical object resembling a physical receptacle (e.g., a physical basket or a physical bucket).

Figure 3C:
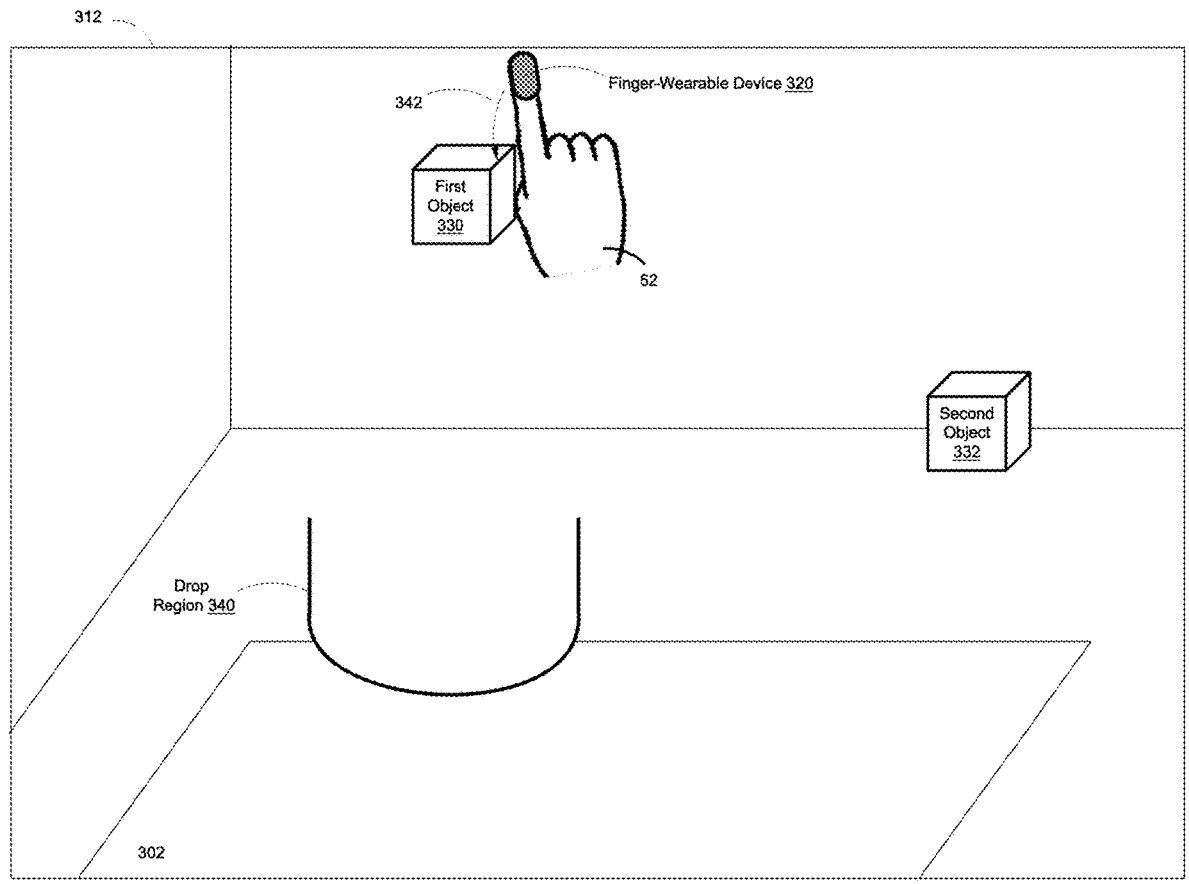
Figure 3D:
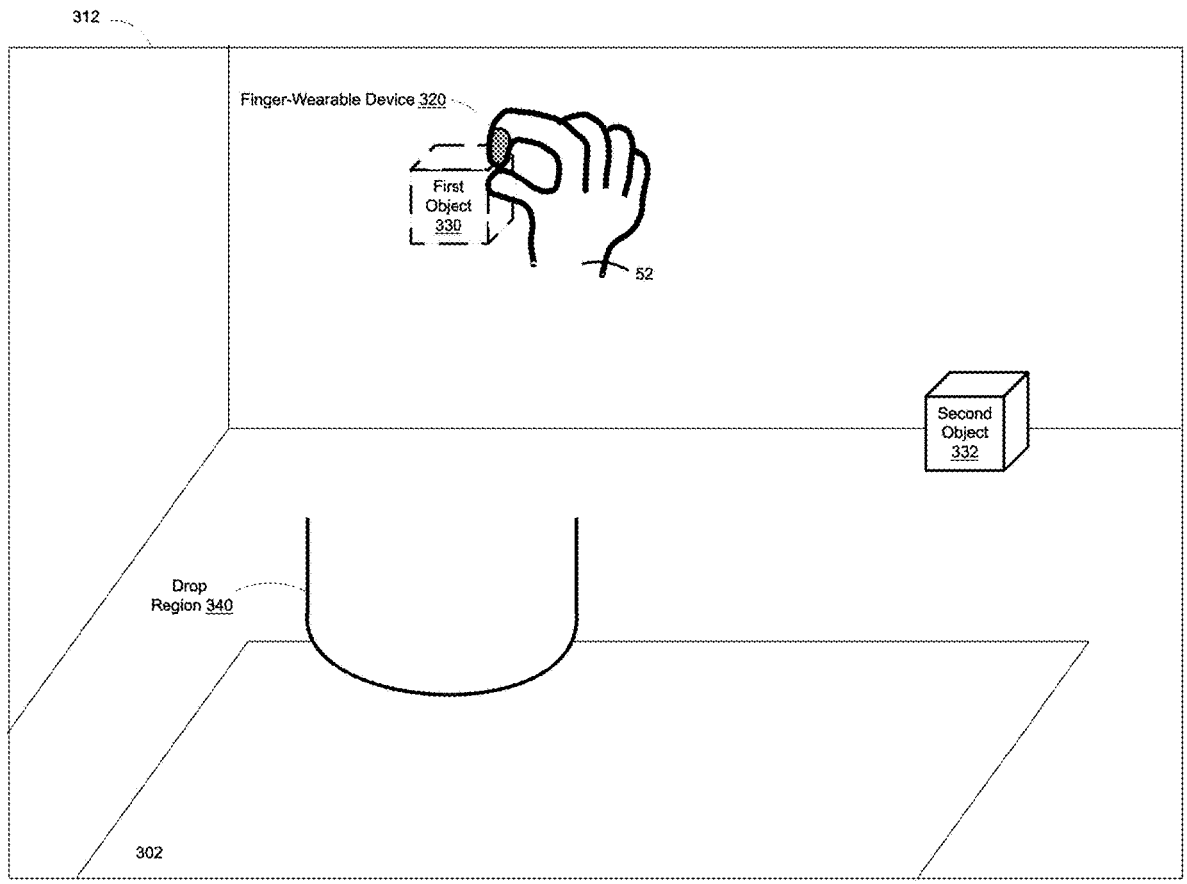

According to various implementations, the electronic device 310 moves a computer-generated object based on finger manipulation data from the finger-wearable device 320. In some implementations, moving a computer-generated object includes selecting the computer-generated object based on finger manipulation data from the finger-wearable device 320. As illustrated in FIG. 3C, the finger-wearable device 320 moves to within the viewable region 314. Accordingly, the electronic device 310 displays, on the display 312, a representation of the finger-wearable device 320 (hereinafter sometimes "the finger-wearable device 320" for the sake of brevity). The finger-wearable device 320 performs a pinch gesture, as is indicated in FIG. 3C by a pinch indicator 342 (illustrated for purely explanatory purposes). As the finger-wearable device 320 performs the pinch gesture, the electronic device 310 obtains finger manipulation data from the finger-wearable device 320. For example, the finger manipulation data includes IMU data indicating the pinch gesture, and magnetic sensor data indicating that, upon finishing performing the pinch gesture, the finger-wearable device 320 is less than a threshold distance from the first computer-generated object 330. Accordingly, based on the finger manipulation data, the electronic device 310 selects the first computer-generated object 330. As illustrated in FIG. 3D, in some implementations, the electronic device 310 changes an appearance of the first computer-generated object 330 from a solid line boundary to a dotted line boundary in order to indicate the selection. Displaying the indication of the selection provides feedback to the user 50, thereby reducing erroneous (e.g., unintended) inputs from the finger-wearable device 320 and reducing resource utilization by the electronic device 310.

In some implementations, the electronic device 310 selects a computer-generated object based on an input from an untethered input system (e.g., eye gaze tracking subsystem and/or computer-vision based extremity tracking subsystem), and moves the selected computer-generated object based on finger manipulation data. For example, the electronic device 310 selects a computer-generated object based on eye gaze data indicating an eye gaze of the user 50 is directed to the computer-generated object. Continuing with this example, the electronic device 310 moves the selected computer-generated object based on detecting movement of the finger-wearable device 320, even when the finger-wearable device 320 is not viewable on the display 312, or is viewable on the display 312 but relatively far from the selected computer-generated object.

Figure 3E:
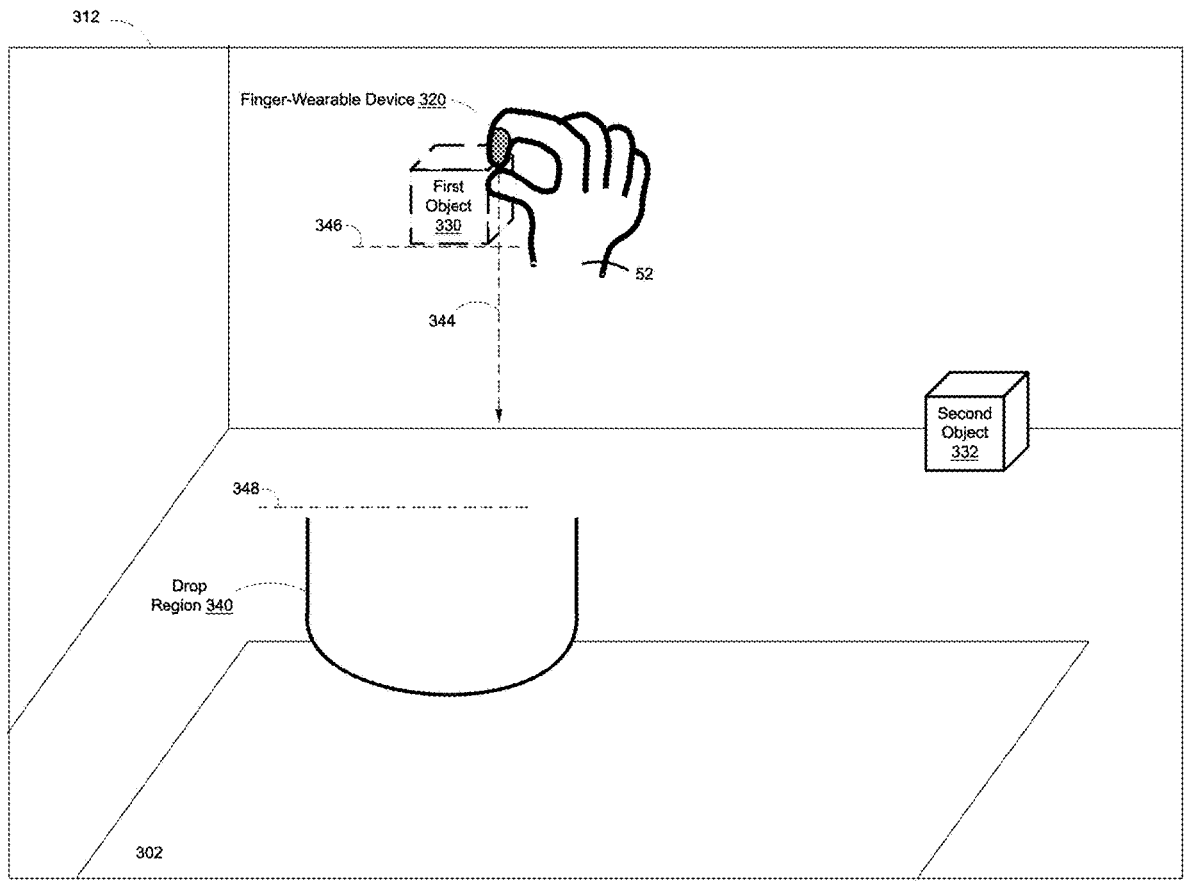
Figure 3F:
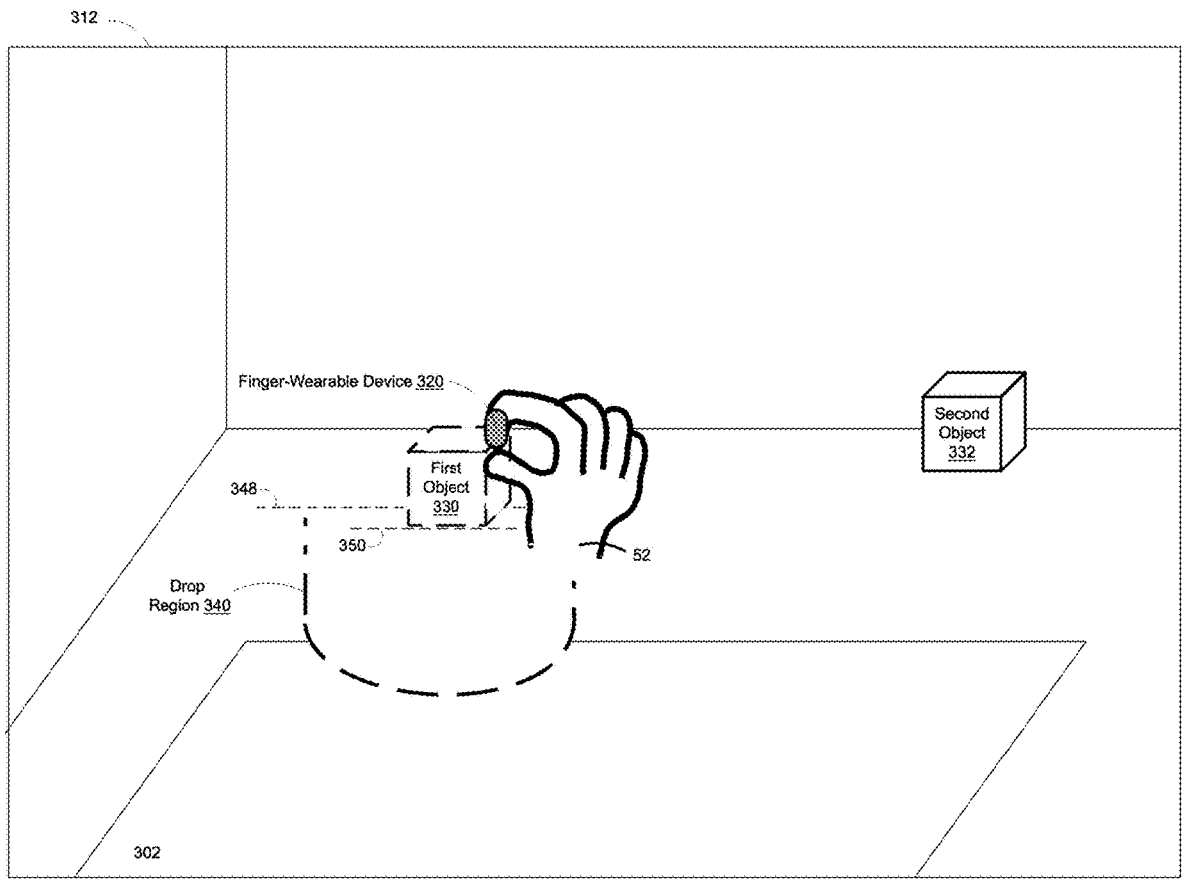

As illustrated in FIGS. 3E and 3F, the electronic device 310 moves the first computer-generated object 330 towards the drop region 340, based on finger manipulation data from the finger-wearable device 320. Namely, as the finger-wearable device 320 moves downwards (indicated by a movement line 344, illustrated for purely explanatory purposes), the electronic device 310 obtains the finger manipulation data from the finger-wearable device 320. For example, the finger manipulation data includes magnetic sensor data that indicates positional information associated with the finger-wearable device 320. Before moving the first computer-generated object 330, the electronic device 310 displays the first computer-generated object 330 at a first position within an environment, as indicated by a first position line 346 (illustrated for purely explanatory purposes). Moreover, a proximity threshold line 348 is illustrated in FIG. 3E (for purely explanatory purposes), indicating a first proximity threshold associated with the drop region 340.

As illustrated in FIG. 3F, based on detecting the downward movement of the finger-wearable device 320, the electronic device 310 moves the first computer-generated object 330 from the first position to a second position within the environment. The second position is indicated by a second position line 350 (illustrated for purely explanatory purposes). Notably, the second position crosses the proximity threshold line 348. In other words, the second position line 350 is closer to the drop region 340 than is the proximity threshold line 348. Accordingly, the electronic device 310 determines that the second position satisfies the first proximity threshold with respect to the drop region 340.

In some implementations, in response to determining that the second position satisfies the first proximity threshold, the electronic device 310 displays, on the display 312, an indicator indicative of the satisfaction of the proximity threshold. For example, the electronic device 310 changes the drop region 340 from having a solid line boundary in FIG. 3E to having a dotted line boundary in FIG. 3F, in order to provide an indication of the satisfaction of the proximity threshold. In some circumstances, displaying the indicator to the user 50 results in the user 50 moving the finger-wearable device 320 less, thereby reducing resource utilization by the electronic device 310. In some implementations, rather than initially displaying a computer-generated drop region along with the first computer-generated object 330, the electronic device 310 displays a computer-generated drop region in response to determining that the second position satisfies the first proximity threshold.

Figure 3G:
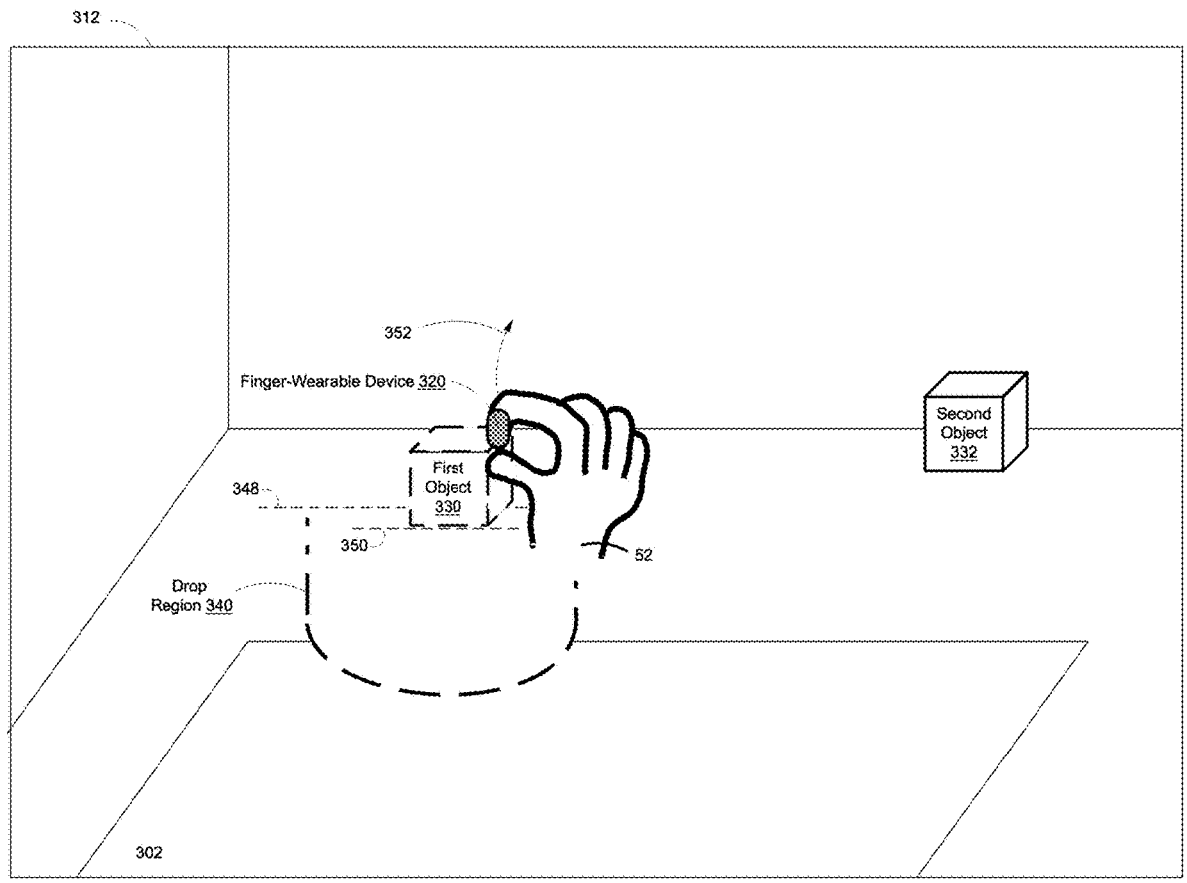
Figure 3H:
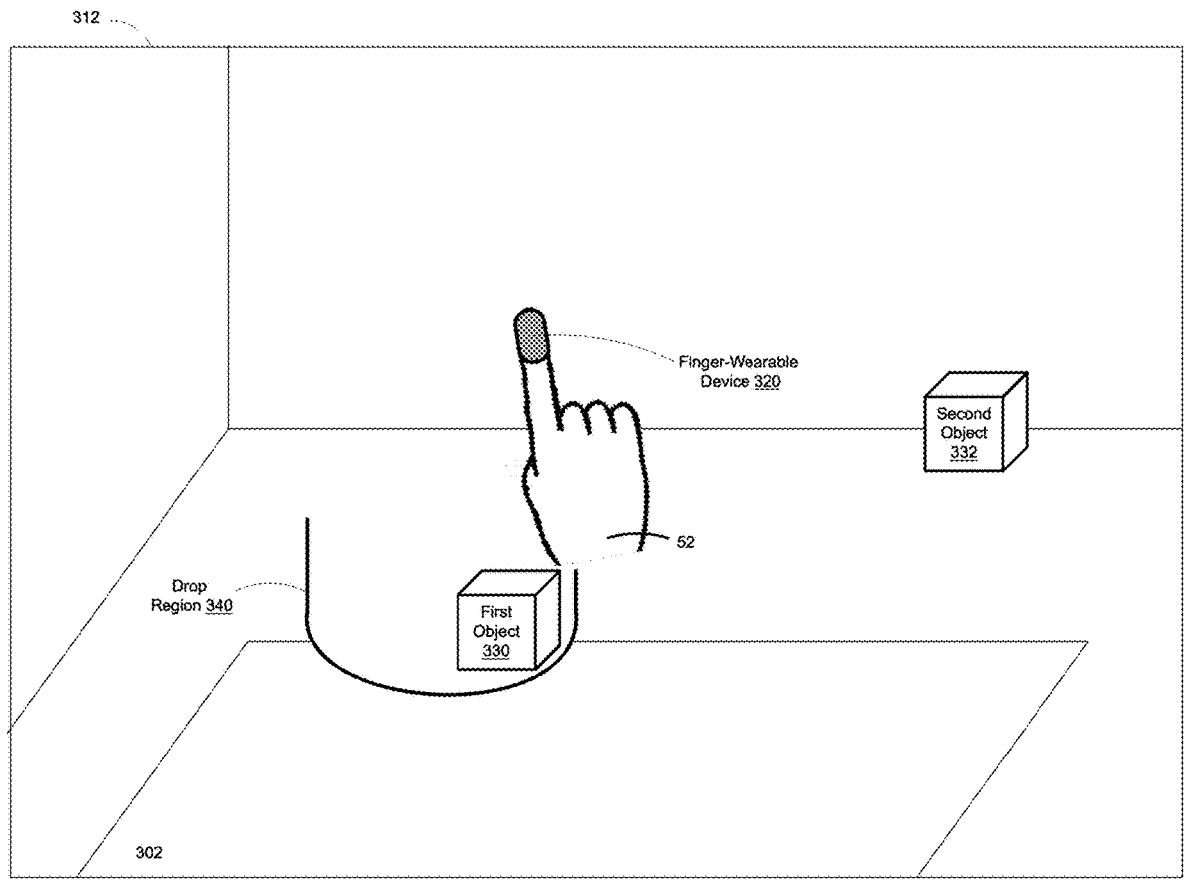

In response to determining that the second position satisfies the first proximity threshold, the electronic device 310 determines whether one or more drop criteria are satisfied. In some implementations, the one or more drop criteria include a disengagement criterion associated with the computer-generated object. For example, as illustrated in FIGS. 3G and 3H, as the finger-wearable device 320 performs a de-pinch gesture (as indicated by a de-pinch line 352, illustrated for purely explanatory purposes), the electronic device 310 obtains finger manipulation data from the finger-wearable device 320. Continuing with this example, the electronic device 310 detects, based on the finger manipulation data, that the finger-wearable device 320 performs the de-pinch gesture, and that the de-pinch gesture is associated with the first computer-generated object 330. For example, IMU data from the finger-wearable device 320 indicates a de-pinch gesture, and magnetic sensor data from the finger-wearable device 320 indicates the de-pinch gesture is less than a threshold distance from the first computer-generated object 330. Accordingly, the electronic device 310 determines that the de-pinch gesture satisfies the disengagement criterion. One of ordinary skill in the art will appreciate that, in some implementations, the disengagement criterion is satisfied by a different gesture performed by the finger-wearable device 320 (e.g., tap, double tap), or is satisfied independently of detecting a gesture performed by the finger-wearable device 320. For example, in some implementations, based on finger manipulation data indicating that the finger-wearable device 320 nominally moves (e.g., no gesture) for more than a threshold amount of time while satisfying the proximity threshold, the electronic device 310 determines that the finger manipulation data satisfies the disengagement criterion.

In response to determining that the finger manipulation data satisfies the one or more drop criteria, the electronic device 310 (e.g., automatically, without additional user intervention) moves the first computer-generated object 330 from the second position to a third position that is within the drop region 340. Namely, as illustrated in FIG. 3H, in response to detecting the de-pinch gesture, the electronic device 310 moves the first computer-generated object 330 to within (e.g., inside of) the drop region 340. In some implementations, the electronic device 310 moves the first computer-generated object 330 to a particular location within the drop region 340 based on finger manipulation data. For example, with reference to FIG. 3G, IMU data and magnetic sensor data together indicate that, upon completion of the de-pinch gesture, the finger-wearable device 320 is closer to the right edge of the drop region 340. Continuing with this example, the electronic device 310 correspondingly moves the first computer-generated object 330 to a position nearer to the right edge of the drop region 340, as illustrated in FIG. 3H. As another example, in some implementations, the finger-wearable device 320 includes a specialized sensor, and the electronic device 310 uses data from the specialized data (rather than data from the IMU) in order to detect a pinch gesture and/or a pinch-release (e.g., a de-pinch) gesture.

In some implementations, the one or more drop criteria include a focus criterion associated with the drop region 340. FIGS. 3I-3M illustrate the operation of the focus criterion.

Figure 3I:
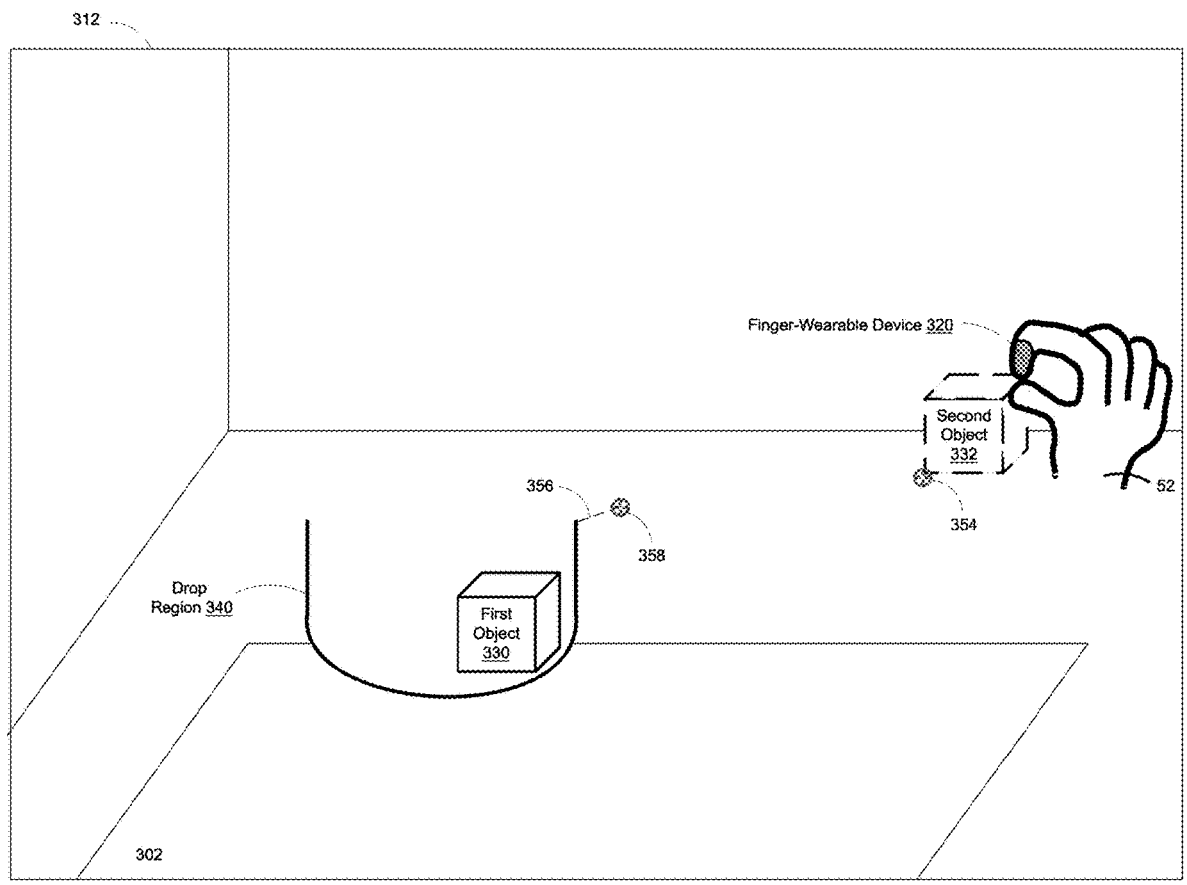

As illustrated in FIG. 3I, based on finger manipulation data from the finger-wearable device 320 (e.g., indicative of a pinch gesture), the electronic device 310 selects the second computer-generated object 332. Accordingly, the electronic device 310 changes the appearance of the second computer-generated object 332 from having solid line boundaries to having dotted line boundaries in order to indicate the selection. The second computer-generated object 332 is positioned at a fourth position within the environment. The fourth position is indicated by a first corner indicator 354 (illustrated for purely explanatory purposes), which corresponds to the bottom-left corner of the second computer-generated object 332. Moreover, a proximity threshold indicator 358 is illustrated in FIG. 3I (for purely explanatory purposes). The proximity threshold indicator 358 indicates a second proximity threshold with respect to the drop region 340. The second proximity threshold is a threshold distance from the drop region 340, wherein the threshold distance is indicated by a threshold line 356 (illustrated for purely explanatory purposes).

Figure 3J:
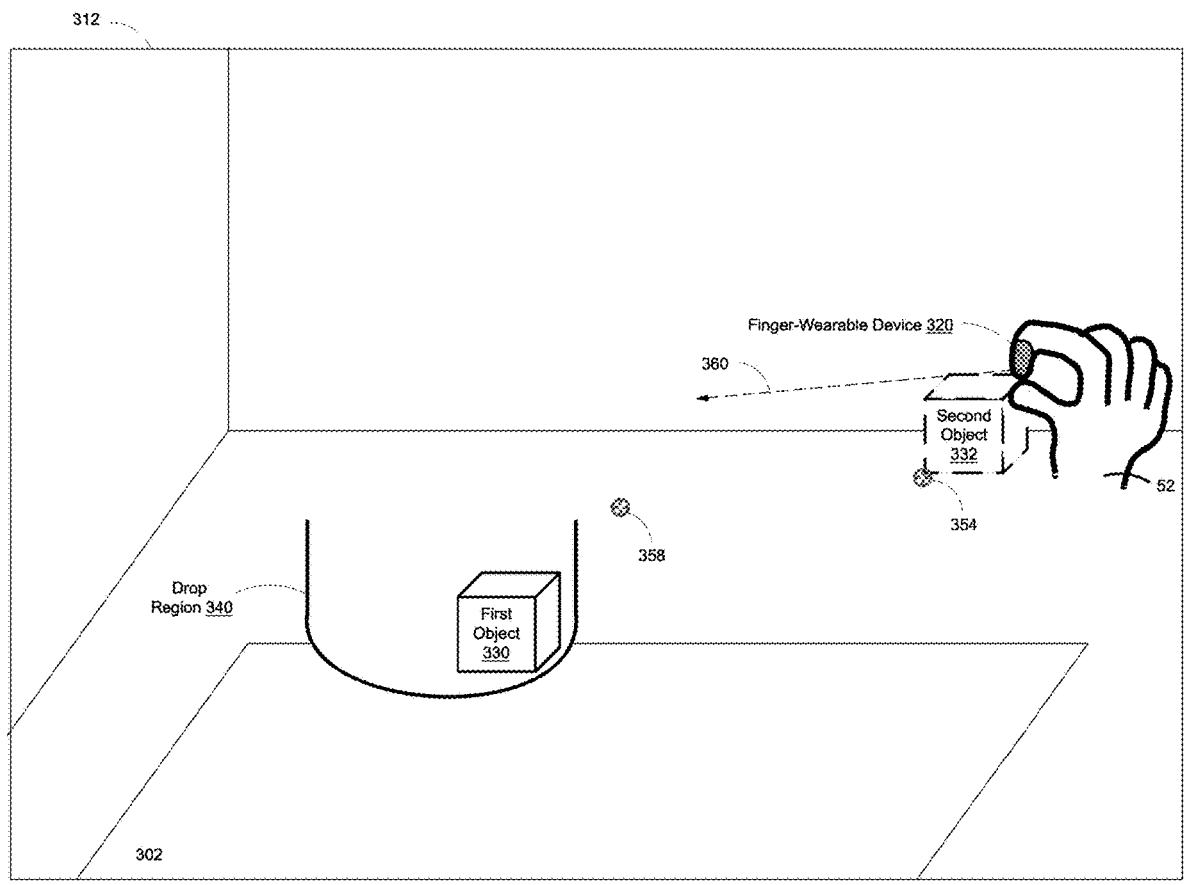

With reference to FIG. 3J, as the finger-wearable device 320 performs a leftwards and downwards movement (indicated by a movement line 360, illustrated for purely explanatory purposes), the electronic device 310 obtains finger manipulation data from the finger-wearable device 320. For example, the electronic device 310 obtains magnetic sensor data indicative of a translational movement of the finger-wearable device 320.

Figure 3K:
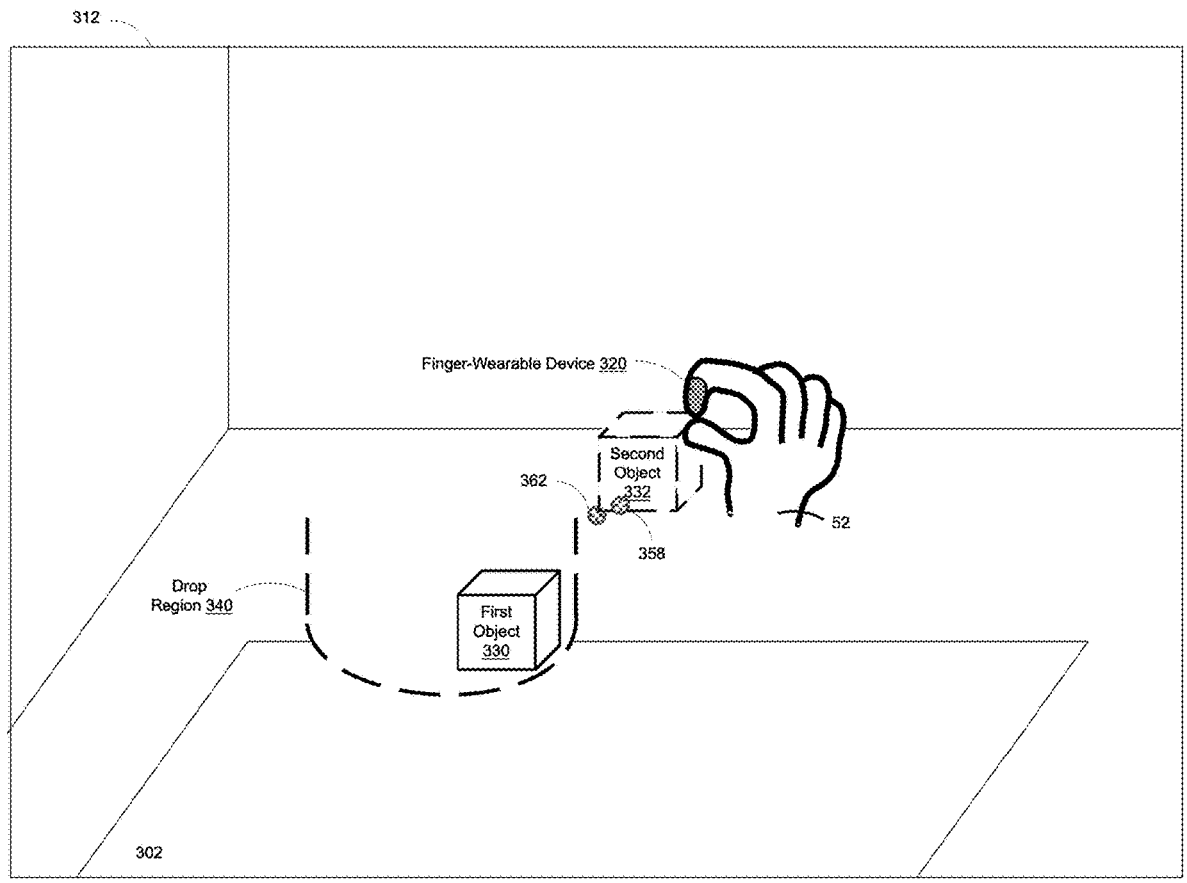

As illustrated in FIG. 3K, based on the finger manipulation data, the electronic device 310 moves the second computer-generated object 332 to a fifth position. The fifth position is indicated by a second corner indicator 362 (illustrated for purely explanatory purposes). The electronic device 310 determines that the fifth position satisfies the second proximity threshold with respect to the drop region 340 because the second corner indicator 362 is closer to the drop region 340 than is the proximity threshold indicator 358. In some implementations, in response to determining that the fifth position satisfies the second proximity threshold, the electronic device 310 displays an indicator indicative of the satisfaction of the second proximity threshold. For example, as illustrated in FIGS. 3J and 3K, the electronic device 310 changes the drop region 340 from having solid boundary lines to dotted boundary lines.

Figure 3L:
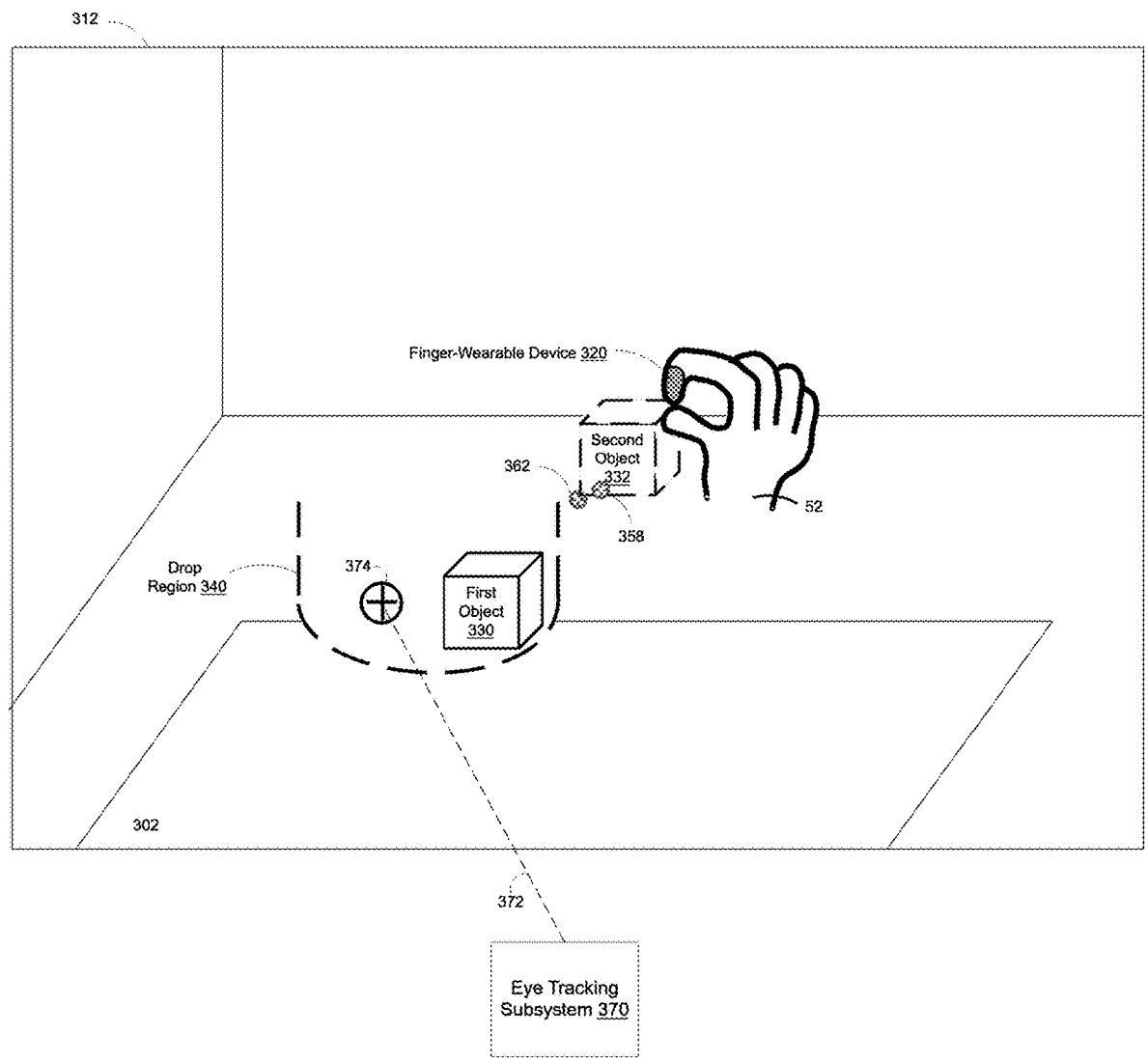

In response to determining that the fifth position satisfies the second proximity threshold, the electronic device 310 determines whether one or more drop criteria are satisfied. In some implementations, the one or more drop criteria include a focus criterion associated with the drop region 340. For example, in some implementations, the electronic device 310 detects, via an input device (e.g., an eye tracking subsystem, a computer-vision based extremity tracking subsystem, etc.), an input that is associated with a spatial region. As one example, as illustrated in FIG. 3L, the electronic device 310 receives, from an eye tracking subsystem 370, eye tracking data associated with the user 50. Reception of the eye tracking data is indicated by a tracking line 372 (illustrated for purely explanatory purposes). The electronic device 310 determines, based on the eye tracking data, a user gaze corresponding to the spatial region. The user gaze is indicated by a reticle 374 (illustrated for purely explanatory purposes). The electronic device 310 determines that the user gaze satisfies the focus criterion because the user gaze is within the drop region 340. In some implementations, the user gaze satisfies the focus criterion when the user gaze is directed to within the drop region 340 for more than a threshold amount of time.

Figure 3M:
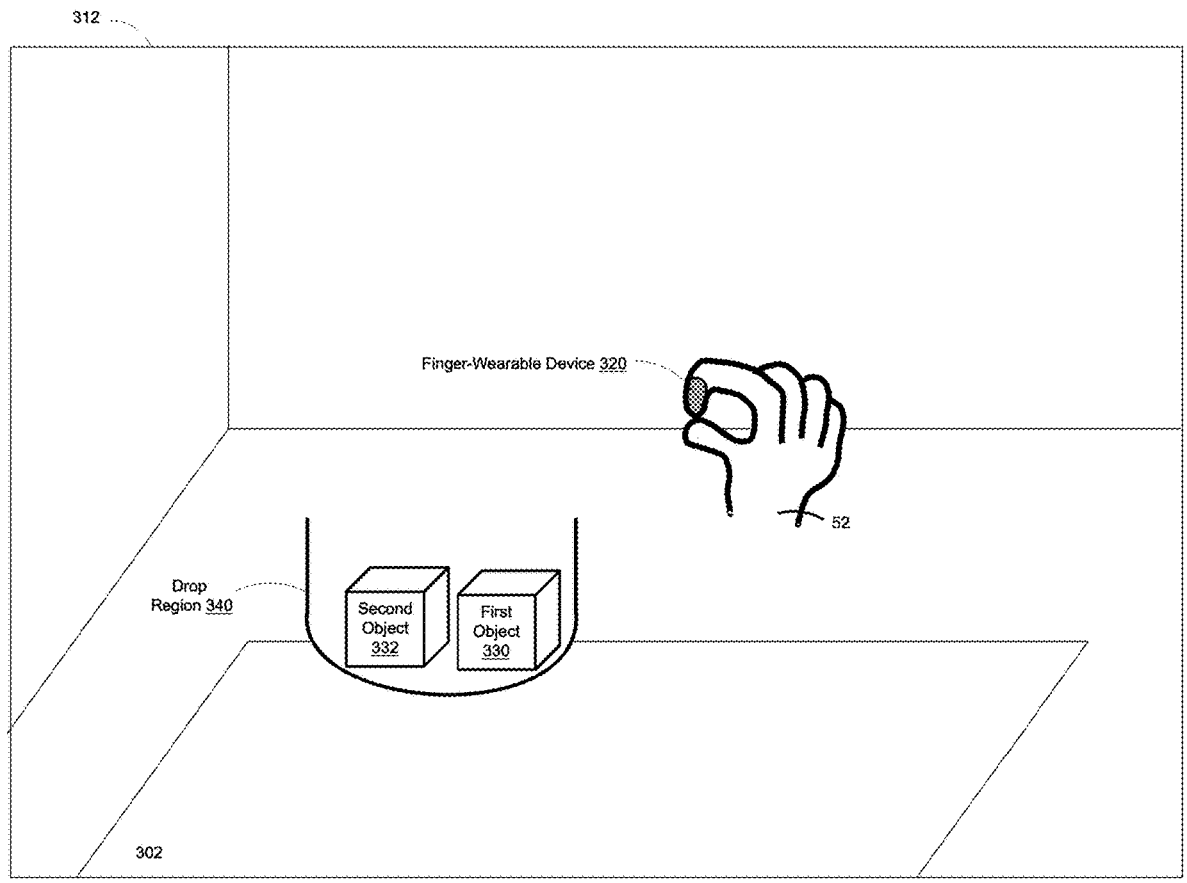

As illustrated in FIG. 3M, in response to determining that the user gaze satisfies the focus criterion, the electronic device 310 moves the second computer-generated object 332 to a sixth position that is within the drop region 340. For example, because the user gaze is directed to the left half of the drop region 340, the electronic device 310 moves the second computer-generated object 332 to the left half of the drop region 340. As a counterexample, had the user gaze been directed to within the right half of the drop region 340 (e.g., focus on the first computer-generated object 330), the electronic device 310 would shift the first computer-generated object 330 leftwards towards the left half of the drop region 340, and move the second computer-generated object 332 to the right half of the drop region 340.

Figure 4:
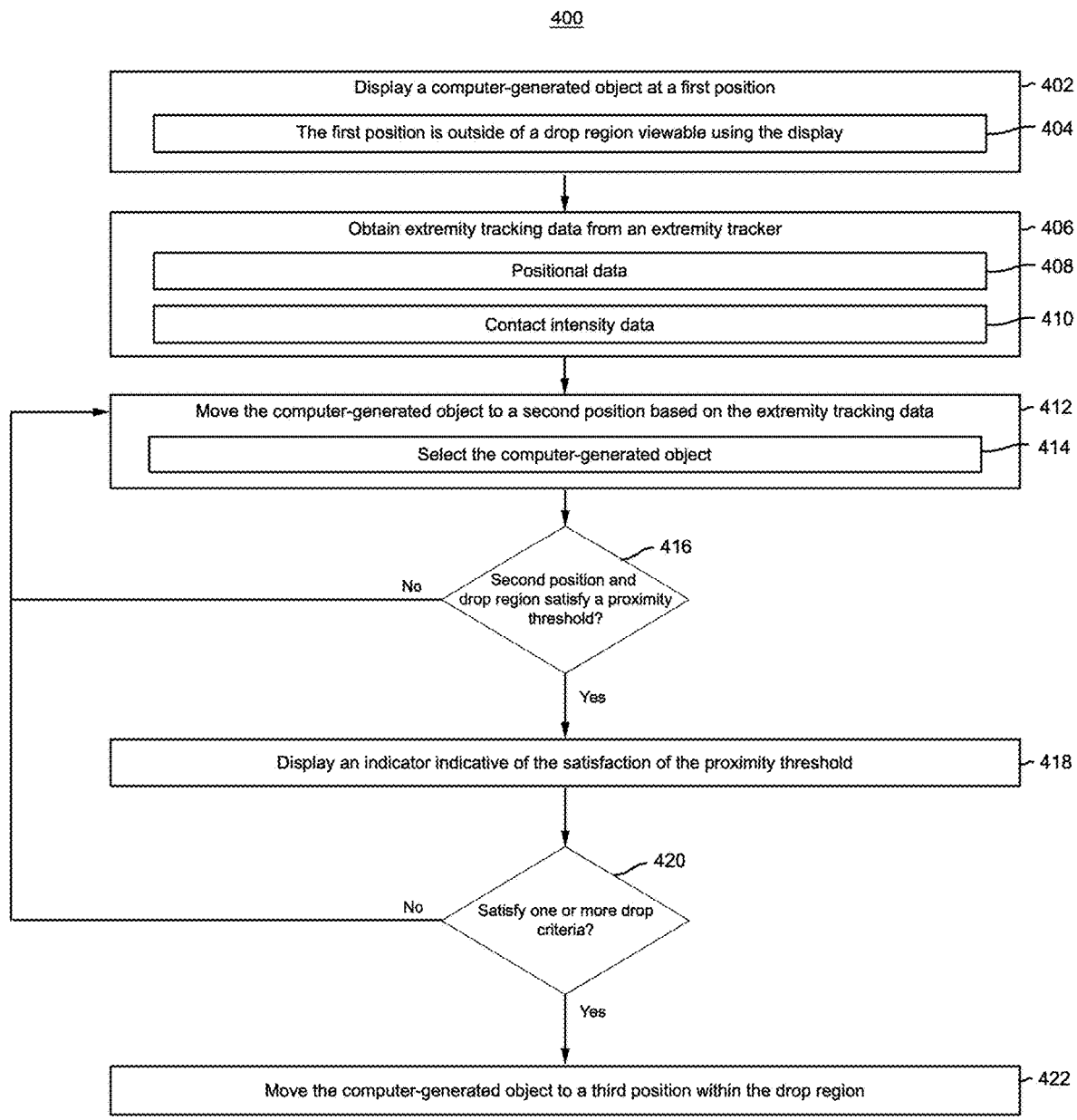
FIG. 4 is an example of a flow diagram of a method of moving a computer-generated object to within a drop region based on finger manipulation data in accordance with some implementations.

FIG. 4 is an example of a flow diagram of a method 400 of moving a computer-generated object to within a drop region based on finger manipulation data in accordance with some implementations. In various implementations, the method 400 or portions thereof are performed by an electronic device (e.g., the electronic device 100 in FIG. 1 or the electronic device 310 in FIGS. 3A-3M). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying a computer-generated object at a first position on a display. As represented by block 404, the first position is outside of a drop region that is viewable using the display. For example, with reference to FIG. 3B, the electronic device 310 displays, on the display 312, the first computer-generated object 330 outside of the drop region 340, which is viewable using the display 312. In some implementations, the drop region corresponds to a computer-generated drop region, and the method 400 includes displaying the computer-generated drop region while displaying the computer-generated object. For example, with reference to FIG. 3B, the electronic device 310 concurrently displays, on the display 312, the first computer-generated object 330 and the computer-generated drop region 340. In some implementations, the drop region corresponds to a physical drop region (e.g., a physical bucket), and the method 400 includes identifying the physical drop region by performing a computer-vision technique. For example, the method 400 includes performing instance segmentation or instance segmentation with respect to image data from an integrated image sensor.

As represented by block 406, the method 400 includes, while displaying the computer-generated object at the first position, obtaining extremity tracking data from an extremity tracker. In some implementations, the extremity tracker includes a computer vision system that identifies an extremity within image data, such as via instance segmentation or instance segmentation with respect to the image data. Moreover, the computer vision system generates the extremity tracking data based on the identification of the extremity.

In some implementations, an electronic device performing the method 400 includes a communication interface provided to communicate with a finger-wearable device, and obtaining the extremity tracking data includes obtaining finger manipulation data from the finger-wearable device via the communication interface. For example, as described with reference to FIGS. 3A-3M, the electronic device 310 obtains various types of finger manipulation data from the finger-wearable device 320. The finger manipulation data may indicate positional information (e.g., six degrees of freedom information) and contact intensity information (e.g., force or pressure information) associated with the finger-wearable device. In some implementations, the finger manipulation data is indicative of a gesture performed by the finger-wearable device.

According to various implementations, the finger manipulation data corresponds to sensor data associated with one or more sensors integrated in the finger-wearable device. For example, as represented by block 408, the sensor data includes positional data output from one or more positional sensors integrated in the finger-wearable device. As one example, the positional data is indicative of a rotational movement (e.g., IMU data) and/or a translational movement (e.g., magnetic sensor data) of the finger-wearable device, such as is illustrated in FIGS. 3J and 3K. In some implementations, the magnetic sensor data is output by a magnetic sensor that is integrated within the finger-wearable device, wherein the magnetic sensor senses weak magnetic fields. As another example, as represented by block 410, the sensor data includes contact intensity data output from a contact intensity sensor integrated in the finger-wearable device, such as in connection with a tap gesture performed on the physical table 302. As one example, the contact intensity data includes interferometer data that is indicative of tap pressure associated with a gesture that is performed by the finger-wearable device. The interferometer data may be from an interferometer that is integrated within the finger-wearable device. For example, the interferometer data indicates a pressure level associated with a finger, wearing the finger-wearable device, contacting a physical object. As one example, the finger-wearable device senses (e.g., via the contact intensity sensor) deflection of a pad of a finger when the finger contacts the physical surface. Accordingly, various implementations disclosed herein enable a user to feel a physical surface (and the texture of the physical surface) with which the user is interacting. As yet another example, in some implementations, the sensor data includes a combination of the positional data and the contact intensity data.

As represented by block 412, the method 400 includes moving the computer-generated object from the first position to a second position on the display based on the extremity tracking data. For example, the second position is outside of, but less than a threshold distance from, the drop region. As one example, with reference to FIGS. 3J and 3K, the finger manipulation data indicates a leftwards and downwards movement, and thus the electronic device 310 correspondingly moves the second computer-generated object 332 downwards and leftwards on the display 312.

As represented by block 414, in some implementations, moving the computer-generated object from the first position to the second position includes selecting the computer-generated object. For example, with reference to FIGS. 3C and 3D, selecting the computer-generated object includes determining that the finger manipulation data is indicative of a pinch gesture, as indicated by the pinch indicator 342. In some implementations, selecting the computer-generated object includes determining that the pinch gesture satisfies a distance threshold with respect to the computer-generated object, based on the finger manipulation data. In some implementations, in response to selecting the computer-generated object, the method 400 includes changing an appearance of the computer-generated object in order to indicate the selection, such as changing the first computer-generated object 330 from solid boundary lines to dotted boundary lines, as illustrated in FIGS. 3B and 3C.

In some implementations, selecting the computer-generated object is based on an intent function associated with one or more fingers of a user. The intent function may be determined based on the extremity tracking data, such as a predicted movement of one or more user extremities based on historical extremity tracking data. For example, the method 400 includes determining a pinch point between a user's thumb and a user's index finger in three-dimensional (3D) space. The pinch point may fluctuate between the user's thumb and the user's index finger, based on the intent function.

In some implementations, moving the computer-generated object from the first position to the second position is further based on an untethered input from an untethered input system, which is integrated within an electronic device. For example, in some implementations, the untethered input system includes an eye gaze subsystem that outputs eye gaze data. The eye gaze data indicates a user gaze position. As one example, in some implementations, in response to determining that the user gaze position is less than a threshold distance from a computer-generated object, the method 400 includes selecting the computer-generated object. Continuing with this example, the method 400 includes moving the selected computer-generated object based on finger manipulation data. Continuing with this example, the finger manipulation data may indicate a pinch-pull gesture or a throw gesture (e.g., moving the selected computer-generated object based on a velocity characteristic or an inertia characteristic associated with the finger-wearable device). Accordingly, the method 400 enables efficient movement of a computer-generated object that is associated with a relatively large depth value, such as a computer-generated object positioned at the background of a scene.

As represented by block 416, the method 400 includes determining whether or not the second position satisfies a proximity threshold with respect to the drop region. In some implementations, the second position satisfies the proximity threshold when the second position is less than a threshold distance from the drop region. For example, with reference to FIG. 3F, the electronic device 310 determines that the second position (indicated by the second position line 350) satisfies the proximity threshold with respect to the drop region 340 (indicated by the proximity threshold line 348).

In accordance with a determination that the second position satisfies the proximity threshold, the method 400 proceeds to a portion of the method 400 represented by block 418 or block 420. On the other hand, in accordance with a determination that the second position does not satisfy the proximity threshold, the method 400 reverts back to the portion of the method 400 represented by block 412.

As represented by block 418, in some implementations, in response to determining that the second position satisfies the proximity threshold with respect to the drop region, the method 400 includes displaying an indicator indicative of the satisfaction of the proximity threshold. For example, with reference to FIG. 3K, the electronic device 310 changes the drop region 340 from having solid line boundaries to dotted line boundaries in response to determining that the fifth position of the second computer-generated object 332 satisfies the proximity threshold with respect to the drop region 340. In some implementations, the indicator satisfies a proximity threshold with respect to the drop region. For example, the indicator is positioned at the boundary of the drop region, within the drop region, or less than a threshold distance from the drop region.

As represented by block 420, the method 400 includes determining whether or not one or more drop criteria are satisfied. In other words, the method 400 includes detecting satisfaction or non-satisfaction of the one or more drop criteria.

In some implementations, the one or more drop criteria include a disengagement criterion associated with the computer-generated object. For example, in some implementations, detecting satisfaction of the one or more drop criteria includes determining that the extremity tracking data satisfies the disengagement criterion. As one example, determining that the extremity tracking data satisfies the disengagement criterion includes determining that the finger manipulation data is indicative of a de-pinch gesture, as is illustrated in FIGS. 3G and 3H. As another example, determining that the finger manipulation data satisfies the disengagement criterion includes determining that the finger manipulation data is indicative of a nominal amount of movement associated with the finger-wearable device for more than a threshold amount of time.

In some implementations, the one or more drop criteria include a focus criterion associated with the drop region. To that end, in some implementations, the method 400 includes detecting, via an input device, an input that is associated with a spatial region of the environment. Continuing with this example, detecting satisfaction of the one or more drop criteria includes determining that the spatial region satisfies the focus criterion. In some implementations, detecting satisfaction of the focus criterion includes determining that the spatial region satisfies a proximity threshold with respect to the drop region.

As one example, with reference to FIG. 3L, the input device is the eye tracking subsystem 370. The eye tracking subsystem 370 outputs eye tracking data that indicates an eye gaze of the user 50 (indicated by reticle 374 in FIG. 3L). Continuing with this example, determining that the spatial region satisfies the focus criterion includes determining that the eye gaze of the user 50 is focused within the drop region 340 (or is proximate to the drop region 340).

As another example, the input device is a computer-vision based extremity tracking subsystem that outputs extremity tracking data, independent of obtaining finger manipulation data from a finger-wearable device. The extremity tracking data indicates a position of an extremity of a user. Continuing with this example, determining that the spatial region satisfies the focus criterion includes determining that the position of the extremity is within or is proximate to the drop region.

In accordance with detecting satisfaction of the one or more drop criteria, the method 400 proceeds to a portion of the method 400 represented by block 422. On the other hand, in accordance with detecting non-satisfaction of the one or more drop criteria, the method 400 reverts back to the portion of the method 400 represented by block 412 (e.g., maintaining the computer-generated object at the second position).

As represented by block 422, the method 400 includes moving the computer-generated object from the second position to a third position that is within the drop region. The method 400 includes automatically (e.g., without additional user intervention) moving the computer-generated object to the third position. As one example, with reference to FIG. 3H, the electronic device 310 moves the first computer-generated object 330 to the right portion within the drop region 340 based on finger manipulation data. As another example, with reference to FIG. 3M, the electronic device 310 moves the second computer-generated object 332 to the left portion within the drop region 340 based on eye tracking data from the eye tracking subsystem 370. Namely, the eye tracking data indicates the eye gaze of the user 50 (e.g., indicated by the reticle 374) is directed to the left portion within the drop region 340.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device with one or more processors, a non-transitory memory, a display, and an extremity tracker:
      while displaying a computer-generated object at a first position within an environment, wherein the first position is outside of a drop region that is viewable using the display, obtaining extremity tracking data from the extremity tracker;
      moving the computer-generated object from the first position to a second position within the environment based on the extremity tracking data, wherein the second position is outside of the drop region; and
      in response to determining that the second position satisfies a proximity threshold with respect to the drop region:
         detecting an input that is directed to a spatial region of the environment; and
         moving the computer-generated object from the second position to a third position that is within the drop region, based on determining that the input satisfies a focus criterion associated with the drop region.

2. The method of claim 1, wherein the extremity tracker includes a communication interface provided to communicate with a finger-wearable device, and wherein obtaining the extremity tracking data includes obtaining finger manipulation data from the finger-wearable device via the communication interface.

3. The method of claim 2, wherein the finger manipulation data corresponds to sensor data associated with one or more sensors integrated within the finger-wearable device.

4. The method of claim 3, wherein the sensor data includes positional data output from one or more positional sensors integrated in the finger-wearable device.

5. The method of claim 3, wherein the sensor data includes contact intensity data output from a contact intensity sensor integrated in the finger-wearable device.

6. The method of claim 1, wherein the extremity tracker includes a computer vision system that identifies an extremity within image data, and generates the extremity tracking data based on the identification of the extremity.

7. The method of claim 1, wherein moving the computer-generated object from the first position to the second position includes selecting the computer-generated object.

8. The method of claim 7, wherein selecting the computer-generated object includes determining that the extremity tracking data is indicative of a pinch gesture.

9. The method of claim 8, wherein selecting the computer-generated object includes determining that the pinch gesture satisfies a distance threshold with respect to the computer-generated object based on the extremity tracking data.

10. The method of claim 1, wherein moving the computer-generated object to the third position is further based on determining that the extremity tracking data satisfies a disengagement criterion associated with the computer-generated object.

11. The method of claim 10, wherein determining that the extremity tracking data satisfies the disengagement criterion includes determining that the extremity tracking data is indicative of a de-pinch gesture.

12. The method of claim 10, wherein determining that the extremity tracking satisfies the disengagement criterion includes determining that the extremity tracking data is indicative of a nominal amount of movement associated with an extremity for more than a threshold amount of time.

13. The method of claim 1, further comprising determining the third position based on the spatial region.

14. The method of claim 1, wherein the extremity tracking data indicates three-dimensional (3D) information, and wherein determining that the second position satisfies the proximity threshold includes identifying, based on the 3D information, a 3D point of the environment that is associated with the second position.

15. The method of claim 1, wherein determining that the spatial region satisfies the focus criterion includes determining that the spatial region satisfies a proximity threshold with respect to the drop region.

16. The method of claim 15, further comprising, in response to determining that the spatial region satisfies the proximity threshold, displaying, on the display, an indicator indicative of the satisfaction of the proximity threshold.

17. The method of claim 1, wherein the drop region corresponds to a physical drop region, the method further comprising identifying the physical drop region by performing a computer vision technique.

18. The method of claim 1, wherein the drop region corresponds to a computer-generated drop region, the method further comprising displaying the computer-generated drop region within the environment while displaying the computer-generated object.

19. An electronic device comprising:
one or more processors;
a non-transitory memory;
a display;
an extremity tracker; and
one or more programs, wherein the one or more programs are stored in the non-transitory memory and configured to be executed by the one or more processors, the one or more programs including instructions for:
while displaying a computer-generated object at a first position within an environment, wherein the first position is outside of a drop region that is viewable using the display, obtaining extremity tracking data from the extremity tracker;
moving the computer-generated object from the first position to a second position within the environment based on the extremity tracking data, wherein the second position is outside of the drop region; and
in response to determining that the second position satisfies a proximity threshold with respect to the drop region:
detecting an input that is directed to associated with a spatial region of the environment; and
moving the computer-generated object from the second position to a third position that is within the drop region, based on determining that the input satisfies a focus criterion associated with the drop region.

20. A non-transitory computer readable storage medium storing one or more programs, the one or more programs comprising instructions, which, when executed by an electronic device with one or more processors, a display, and an extremity tracker, cause the electronic device to:
while displaying a computer-generated object at a first position within an environment, wherein the first position is outside of a drop region that is viewable using the display, obtain extremity tracking data from the extremity tracker;
move the computer-generated object from the first position to a second position within the environment based on the extremity tracking data, wherein the second position is outside of the drop region; and
in response to determining that the second position satisfies a proximity threshold with respect to the drop region:
detect an input that is directed to a spatial region of the environment; and
move the computer-generated object from the second position to a third position that is within the drop region, based on determining that the input spatial region satisfies a focus criterion associated with the drop region.

21. The method of claim 1, wherein determining that the input satisfies the focus criterion includes determining that the input is directed to the drop region for at least a threshold amount of time.

22. The method of claim 1, wherein determining that the input satisfies the focus criterion includes determining that an eye gaze is directed to the drop region.

* * * * *